(12) United States Patent
Schäfer et al.

(10) Patent No.: US 7,506,623 B2
(45) Date of Patent: Mar. 24, 2009

(54) CAMSHAFT ADJUSTMENT DEVICE FOR AN INTERNAL COMBUSTION ENGINE

(75) Inventors: Jens Schäfer, Herzogenaurach (DE); Martin Steigerwald, Erlangen (DE); Jonathan Heywood, Pettstadt (DE)

(73) Assignee: Schaeffler KG, Herzogenaurach (DE)

( * ) Notice: Subject to any disclaimer, the term of this patent is extended or adjusted under 35 U.S.C. 154(b) by 319 days.

(21) Appl. No.: 11/379,401

(22) Filed: Apr. 20, 2006

(65) Prior Publication Data

US 2006/0236965 A1    Oct. 26, 2006

(30) Foreign Application Priority Data

Apr. 23, 2005   (DE) ................. 10 2005 018 956

(51) Int. Cl.
*F01L 1/34* (2006.01)
(52) U.S. Cl. .............. 123/90.17; 123/90.16; 123/90.15; 123/90.11; 475/334; 475/346
(58) Field of Classification Search ............... 123/90.17
See application file for complete search history.

(56) References Cited

U.S. PATENT DOCUMENTS

| 1,470,947 | A | * | 10/1923 | Tyler | 475/347 |
|---|---|---|---|---|---|
| 3,978,829 | A | * | 9/1976 | Takahashi et al. | 123/90.15 |
| 4,092,878 | A | * | 6/1978 | Campbell | 475/342 |
| 4,440,042 | A | * | 4/1984 | Holdeman | 475/269 |
| 5,327,859 | A | * | 7/1994 | Pierik et al. | 123/90.17 |
| 5,474,499 | A | * | 12/1995 | Olson | 464/83 |
| 6,129,061 | A | * | 10/2000 | Okuda et al. | 123/90.17 |
| 6,138,622 | A | * | 10/2000 | Heer | 123/90.17 |
| 6,637,389 | B2 | * | 10/2003 | Schafer et al. | 123/90.17 |
| 6,971,352 | B2 | * | 12/2005 | Meintschel et al. | 123/90.17 |

FOREIGN PATENT DOCUMENTS

| DE | 10038354 | 2/2002 |
|---|---|---|
| WO | 2005080757 | 9/2005 |

\* cited by examiner

*Primary Examiner*—Thomas E Denion
*Assistant Examiner*—Kyle M Riddle
(74) *Attorney, Agent, or Firm*—Lucas & Mercanti, LLP

(57) ABSTRACT

The invention relates to a device (1) for the electrical adjustment of the relative rotary-angle position between a camshaft (2) and a crankshaft of an internal combustion engine, with an adjusting gear (3) which has a driving part (4) fixed with respect to the crankshaft, a driven part (5) fixed with respect to the camshaft and an adjusting shaft (8) connected fixedly in terms of rotation to an adjustment-unit shaft (6) of an electrical adjustment unit (7). In order to achieve a simpler type of construction which, moreover, is distinguished by quiet running, there is provision, according to the invention, for the adjusting shaft (8) to be arranged in a radially floating manner.

11 Claims, 4 Drawing Sheets

CAMSHAFT ADJUSTMENT DEVICE FOR AN INTERNAL COMBUSTION ENGINE

FIELD OF THE INVENTION

The invention relates to a device for the electrical adjustment of the relative rotary-angle position between a camshaft and a crankshaft of an internal combustion engine, with an adjusting gear which has a driving part fixed with respect to the crankshaft, a driven part fixed with respect to the camshaft and an adjusting shaft connected fixedly in terms of rotation to an adjustment-unit shaft of an electrical adjustment unit.

BACKGROUND OF THE INVENTION

Various possibilities are known in the prior art for the relative adjustment of the angular position between the crankshaft and the camshaft of an internal combustion engine. Basically, electric and hydraulic adjusting systems are known. In the electrically driven camshaft adjustment systems, the relatively low torque of the electrical adjustment unit, for example a drive motor or a braking device, which is available in the case of a high rotational speed, is converted into a rotational movement with high torque; such a high torque is necessary for adjusting the camshaft. For this purpose, it is known to use summing gears as adjusting gears. Such a gear has a driving wheel fixed with respect to the crankshaft. Power take-off takes place via a gear output fixed with respect to the camshaft. The differential power of the gear which has to be fed in for adjustment in one direction of rotation or the other is introduced via a third shaft, the adjusting shaft, of the gear.

An electrical camshaft adjustor of this type is known from DE 102 48 355 A1. An adjusting device for the electrical adjustment of the relative rotary-angle position between the camshaft and the crankshaft is disclosed, a triple-shaft gear being used as the adjusting gear, which has a driving part fixed with respect to the crankshaft, a driven part fixed with respect to the camshaft and an adjusting shaft connected fixedly in terms of rotation to an adjusting-motor shaft for an electrical adjusting motor. The adjusting motor is designed, here, as a brushless direct-current motor with a stator fixed with respect to the housing and with a permanent-magnet motor. The adjusting gear used is a double eccentric gear or a double epicyclic gear, a reduction of up to 1:250 being provided here.

The relative adjustment of the camshaft with respect to the crankshaft is also described in other publications, use likewise being made of adjusting gears which can be actuated by an electric motor. EP 1 039 101 A2 uses a harmonic-drive gear as the adjusting gear. This gear operates with a thin elastically deformable toothed sleeve, the toothing of the sleeve meshing with a ring wheel. A compact type of construction of the adjusting gear, along with a high reduction ratio, is consequently possible.

Such a solution is also known from DE 40 22 735 A1, in which such a cycloidal reduction gear is used. A similar type of construction is shown in WO 95/00748.

U.S. Pat. No. 5,680,836 and DE 102 03 621 A1 use an epicyclic gear as the adjusting gear, in order to generate the relative rotation between the crankshaft and camshaft. Such a solution is also known from DE 25 25 746 A1.

The power flux is in this case to be capable of taking place with high efficiency during adjustment, so that the driving electric motor of the braking device can have as small a build as possible. As low a heat loss as possible is in this case to occur. Furthermore, the toothings of the adjusting gear are as far as possible to run, free of play, with respect to one another. If this is not so, during operation, undesirably high-pitched noises arise, the cause of which is primarily the highly variable alternating torque of the camshaft. Plays possibly occurring in the adjusting gear are converted according to the transmission ratio of the gear. It is additionally necessary for the construction space for the torque converter to have as small a configuration as possible, since there is a trend towards an ever more compact type of construction of the internal combustion engine. Furthermore, for safety reasons, certain distances between the body and the internal combustion engine must be adhered to, which likewise requires a compact type of engine construction. Moreover, the adjusting gear must be capable of being implemented as cost-effective as possible, so that the system costs for the electrical camshaft adjuster, consisting of adjusting gear, electric motor/brake and control electronics, can be kept low.

In the previously known solutions, there are, in this respect, restrictions, particularly with regard to quiet running. True-running errors of the toothings used can be kept low only at a high outlay, so that, during the engagement of gearwheels and during their rotation, some generation of noise is unavoidable. The lower the outlay in terms of manufacturing cost in the production of the gearwheels used is, the greater the problem of noise generation becomes.

OBJECT OF THE INVENTION

The object on which the present invention is based is, therefore, to develop a camshaft adjuster of the type mentioned in the introduction, in such a way that higher quiet running of the adjusting gear is possible even when tooth-engagement or true-running errors are present. The production costs are consequently to be capable of being kept low, without this having an adverse effect on the running behaviour of the adjusting gear.

SUMMARY OF THE INVENTION

The solution for achieving this object by means of the invention is characterized in that the adjusting shaft of the adjusting gear is mounted or arranged in a radially floating manner.

In contrast to the known solutions, therefore, the adjusting shaft is no longer even mounted in the true sense, but, instead, is freely displaceable within certain limits and is self-centred via the tooth engagement of the meshing gearwheels.

Preferably, for this purpose, between the adjusting shaft and the adjustment-unit shaft, a coupling is arranged, which allows a slight relative radial displacement between the adjusting shaft and the adjustment-unit shaft. While the adjustment-unit shaft is mounted radially in the electric motor or braking device, both of which are connected fixedly to the internal combustion engine, the radial mounting is not transmitted to the adjusting shaft on account of the radial flexibility of the coupling; instead, the adjusting shaft is moveable radially in relation to the adjustment-unit shaft.

The adjustment unit may be designed as an electric motor or an electrical braking device. The coupling used is preferably an elastomeric coupling or an Oldham coupling.

According to one embodiment, the adjusting gear is designed as a double epicyclic gear. The double epicyclic gear may have two adjacently arranged internal toothings, with which at least one, two or more spur wheels, preferably three spur wheels, meshes or mesh simultaneously, the number of teeth of the two internal toothings being different, and the difference in number of teeth corresponding to the number of spur wheels or to a multiple of this.

The at least one spur wheel may be mounted in a planet carrier, in particular the latter itself functioning as an adjusting shaft. The at least one spur wheel may be mounted in the planet carrier by means of a rolling-bearing mounting; in principle, however, a plain-bearing mounting may also be considered for this purpose.

According to an alternative type of construction, there may also be provision for the at least one, two or more spur wheels to mesh with a centrally arranged sun wheel which is connected to the adjusting shaft (what is known as the Wolfrom gear).

The adjusting gear may also be designed as a double eccentric gear or harmonic drive.

The amount of reduction of the adjusting gear is preferably between 1:2 and 1:250. When the electric adjusting unit used is a motor, this preferably has high-induction permanent-magnet rotors.

The proposed solution affords the advantage that, on account of the floating mounting, the adjusting shaft of the adjusting gear or the gear parts tied to the adjusting shaft is or are centred optimally with respect to the gearwheels with which it meshes or they mesh. The adjusting-shaft parts, by virtue of their radial moveability, can compensate part of the rotary flank play due, for example, to true running errors, thus leading to quieter running. The operating noise is thereby reduced, and, likewise, the risk of jamming during tooth engagement.

It is advantageous, furthermore, that the radial mounting of the adjusting shaft of the adjusting gear or of the gear parts tied to the adjusting shaft may be dispensed with, this not only reducing the friction of the adjusting gear, but also making the gear more cost-effective. Owing to the lower friction, the efficiency of the gear can be increased.

It is also to be noted, in positive terms, that the required construction space of the gear can be reduced.

BRIEF DESCRIPTION OF THE FIGURES

Exemplary embodiments of the invention are illustrated in the drawings in which.

DETAILED DESCRIPTION OF THE FIGURES

Figure 1:
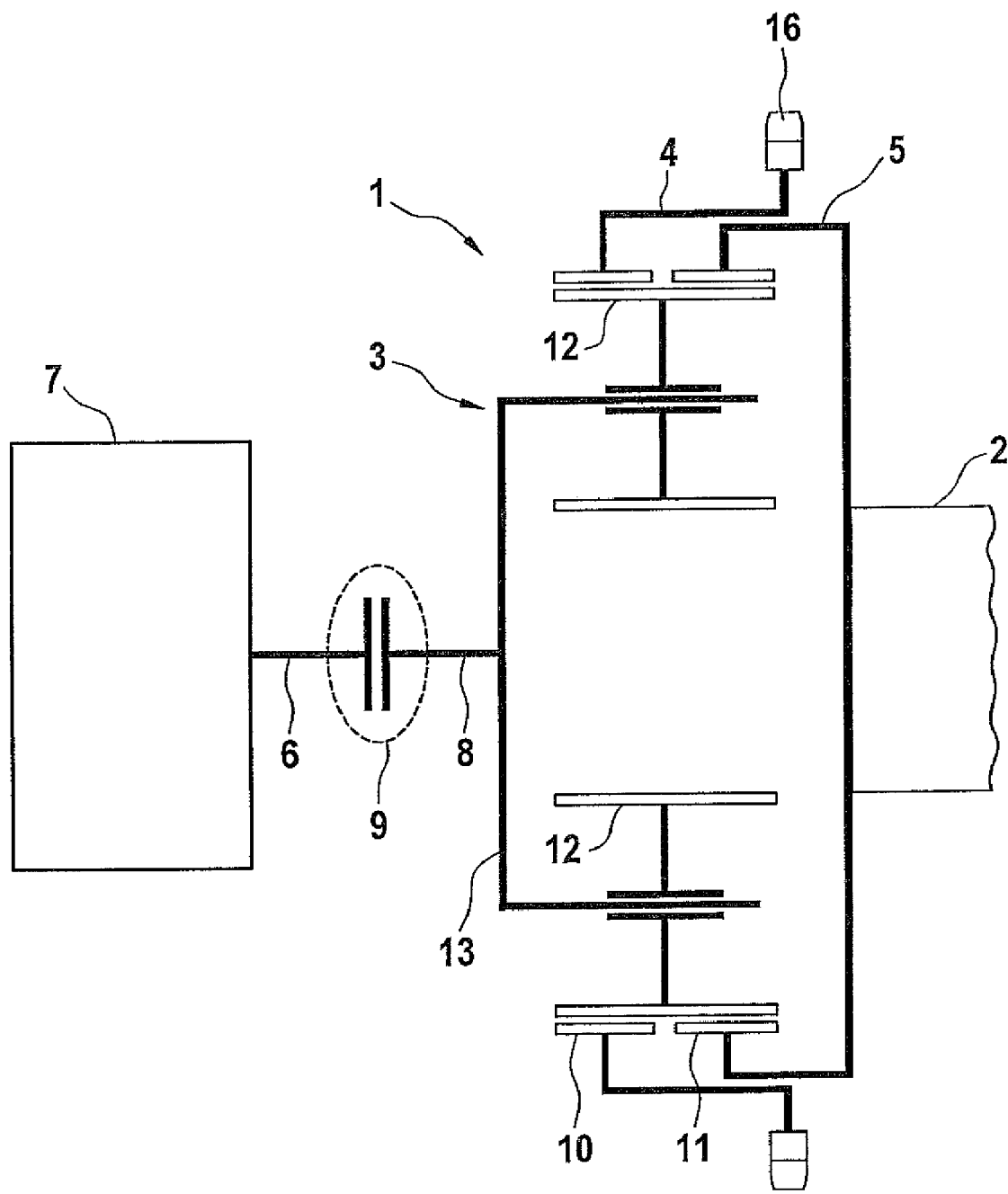
FIG. 1 shows a diagrammatic illustration of a camshaft adjuster which is provided with an electrically driven adjusting gear.

In FIG. 1, a basic diagram can be seen which shows the fundamental construction of a camshaft adjuster which is equipped with an electrically driven adjusting gear. The camshaft adjustment device 1 serves for adjusting the camshaft 2 of an internal combustion engine in relation to the crankshaft of the latter, in order to influence the valve control times. For this purpose, an adjusting gear 3 is provided, which has a driving part 4 fixed with respect to the crankshaft and a driven part 5 fixed with respect to the camshaft. It is indicated diagrammatically that the driving part 4 fixed with respect to the crankshaft has a chain wheel 16, a chain, not illustrated, making the fixed rotational connection with the crankshaft.

The adjusting gear 3 has, as input shaft, an adjusting shaft 8 which is connected fixedly in terms of rotation to an adjustment-unit shaft 6 via a coupling 9, the adjustment-unit shaft 6 being an integral part of an electrical adjustment unit 7, for example an electric motor or a braking device. Since the adjusting gear 3 is configured as a summing gear, the result of a rotation of the adjusting shaft 8 by means of the adjustment unit 7 is that a relative rotation is brought about between the driving part 4 fixed with respect to the crankshaft and the driven part 5 fixed with respect to the camshaft, so that the camshaft control times can be varied between "early contact" and "late contact".

The adjusting shaft 8 is connected to a planet carrier 13, over the circumference of which a number of spur wheels 12 with an external tooth wheel are arranged. The planet carrier 13 ensures that the required axial distance between the spur wheels is maintained.

The driving part 4 fixed with respect to the crankshaft and the driven part 5 fixed with respect to the camshaft have in each case toothings 10 and 11 which are designed in the manner of a ring wheel and with which the spur wheels 12 mesh with their toothings. The two internal toothings 10, 11 in this case have an unequal number of teeth. The difference in the teeth is in this case the number of spur wheels 12 used or a multiple of this.

If, for example, two spur wheels 12 are used, the tooth difference between the toothings 10 and 11 is 2, 4, 6, etc. If three spur wheels 12 are provided, the difference in teeth is 3, 6, 9, etc.

Depending on which gearwheel 10, 11 has the larger number of teeth, the adjusting gear may be designed with a positive or a negative reduction ratio.

As can be seen, the spur wheels 12 are designed with a width such that they simultaneously mesh with the internal toothing 10 and the internal toothing 11.

On account of the different number of teeth between the two toothings 10, 11, the result is that, during the rotary drive of the adjusting shaft 8 and consequently during the rotation of the planet carrier 13, a relative movement between the two toothings 10 and 11 is brought about, which has a high reduction. Typical reductions are around 1:50 to 1:200.

It is essential to the invention that the planet carrier 13 itself is not additionally mounted radially, as is customary in the solutions according to the prior art. It is centred automatically due to the engagements of the toothings of the spur wheels 12 and of the driving and driven parts 4, 5, the said planet carrier being arranged in a floating manner in terms of the radial direction. Tooth engagement errors can consequently be compensated in an improved way, thus leading to a quieter running of the adjusting gear 3.

On account of the floating movement of the planet carrier 13, a slight axial deviation between the planet carrier 13 and the adjustment-unit shaft 6 may occur. The coupling 9 is therefore designed as a radially flexible coupling. It allows slight radial movement between the two shaft parts 6 and 8. The coupling 9 thus ensures that small deviations of the adjusting shaft 8 in the radial direction are compensated, while at the same time it transmits the adjusting torque. Examples of such couplings are elastomeric couplings or Oldham couplings which are sufficiently known as such.

Figure 2:
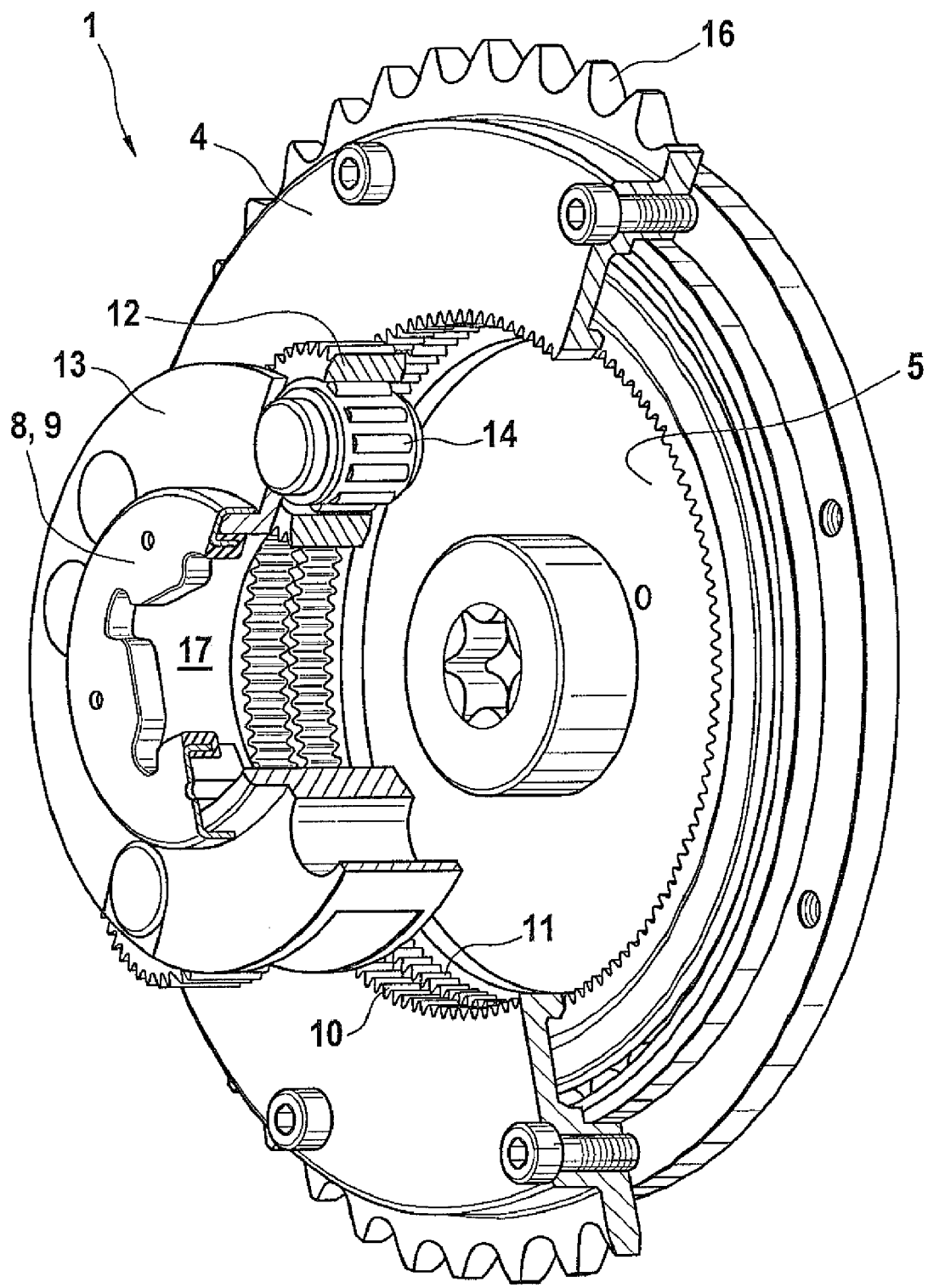
FIG. 2 shows a partially sectional perspective illustration of a camshaft adjuster, in which the adjusting gear is designed as a double epicyclic gear.

FIG. 2 shows an embodiment of the invention in which a double epicyclic gear is used as the adjusting gear. The mounting of the spur wheels 12 in the planet carrier 13 may be designed as a rolling-bearing or a plain-bearing mounting. In the exemplary embodiment, rolling-bearing mountings 14 are used, this resulting in low friction.

To minimize friction, the planet carrier 13 has no axial bearing surfaces, but, instead, the entire planet-carrier unit is guided axially via the side walls of the spur wheels. This avoids the situation where friction acts directly on the planet carrier 13 and therefore on the electrical adjustment unit 7 on account of the axial bearing contact, which would result in an impairment in efficiency.

It should also be mentioned, with regard to the solution according to FIG. 2, that, here, the adjusting shaft 8 is designed as or functions as a part together with a portion of the coupling 9. The coupling 9 is designed as an elastomeric coupling. A coupling part, not illustrated, which is connected to the adjustment-unit shaft (not illustrated), engages into the recess 17 illustrated in FIG. 2. The coupling 9 allows a slight radial movement between the adjustment-unit shaft and the coupling part given the reference numeral 8. The planet carrier 13 is consequently arranged in a radially floating manner.

Figure 3:
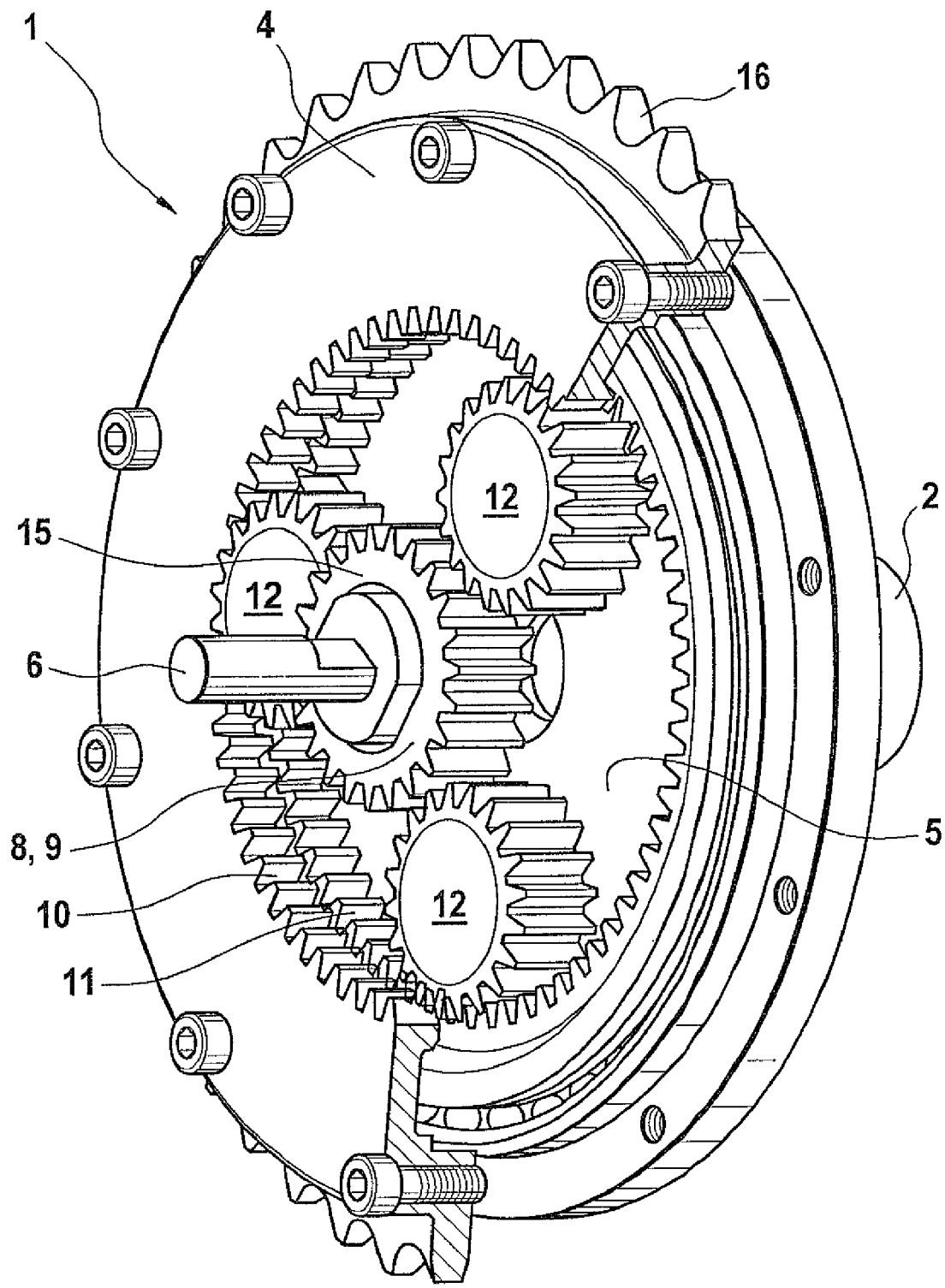
FIG. 3 shows a partially sectional perspective illustration of a camshaft adjuster, in which the adjusting gear is designed as a Wolfrom gear.

In the embodiment according to FIG. 3, there is provision for the adjusting gear to be designed as a Wolfrom gear, that is to say as a gear belonging to the generic type of epicyclic gears. The adjusting gear has two ring wheels mounted with respect to one another and having the internal toothings 10 and 11, which again are connected to the crankshaft and to the camshaft respectively. Furthermore, there is again simultaneous tooth engagement with a plurality of the spur wheels 12. As in the case of the double epicyclic gear, here too, the difference in the number of teeth between the toothings 10 and 11 must again be as great as the number of spur wheels 12 or a multiple of this. The adjustment of the adjusting gear takes place, here, by means of a sun wheel 15 which is in engagement with all the spur wheels 12 and which is again arranged in a radially floating manner. The difference from a Wolfrom gear previously known as such is therefore that the sun wheel 15 and the spur wheels 12 (planet wheels) are positioned radially via the tooth engagements only.

The coupling 9 provided here is an Oldham coupling sufficiently known as such. It should be noted, again, that, here too, the adjusting shaft 8 is designed as or functions as a part together with a portion of the coupling 9. The Oldham coupling 9 also allows a slight radial movement between the adjustment-unit shaft and the coupling part given the reference numeral 8.

Figure 4:
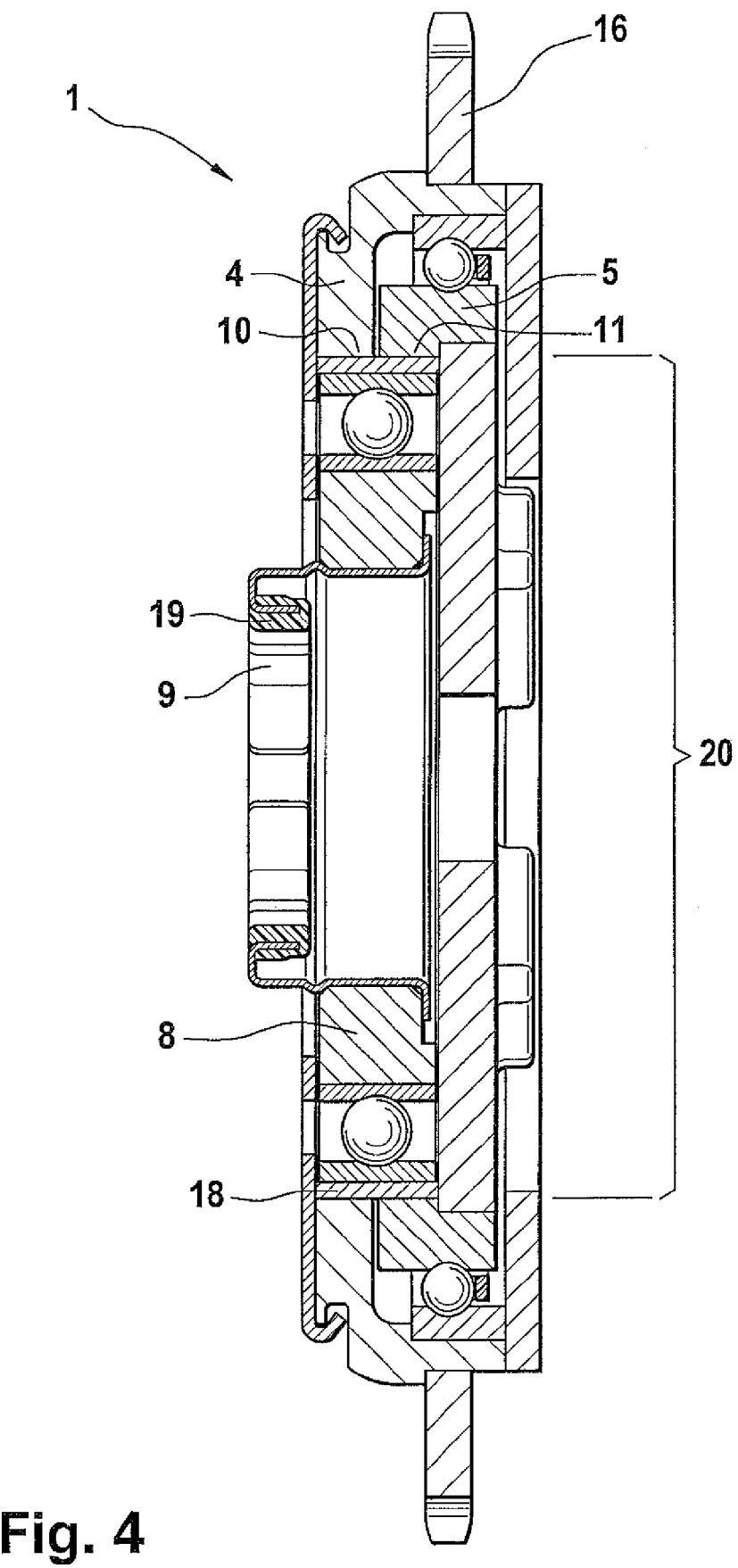
FIG. 4 shows a radial section through a camshaft adjuster, in which the adjusting gear is designed as a harmonic drive.

As FIG. 4 shows, for example, a harmonic drive may also be used as the adjusting gear 3 instead of an epicyclic gear. The harmonic drive and the harmonic-drive gear, which is sufficiently known as such, operate on the same principle.

The driven part 5 fixed with respect to the camshaft has an internal toothing 11, whilst the driving part 4 fixed with respect to the crankshaft has the internal toothing 10. The two toothings 10, 11 are in engagement with an externally toothed thin-walled sleeve 18. The adjusting shaft 8, shaped elliptically here, leads to the engagement of the toothings 10 and 11 with the external toothing of the sleeve 18 at two mutually opposite circumferential points on the sleeve 18. During the rotation of the adjusting shaft 8 by means of the adjustment-unit shaft (not illustrated), the reduction effect of the harmonic drive therefore occurs.

The adjusting shaft 8 is connected to a coupling 9 which, in the present case, brings about the floating arrangement according to the invention of the adjusting shaft 8 due to the use of elastomeric material 19. The radial region, marked in FIG. 4 by the reference symbol 20, of the adjusting shaft 8, together with adjacent components, is therefore arranged in a floating manner, that is to say centring takes place solely by means of the tooth engagements without any radial mounting.

In principle, any desired types of adjusting gear 3 may be used in order to implement the concept of the invention. Examples which may be mentioned are swashplate mechanisms known per se or the slider-crank mechanism having non-uniform transmission ratios.

LIST OF REFERENCE SYMBOLS

1 Camshaft adjustment device
2 Camshaft
3 Adjusting gear
4 Driving part fixed with respect to the crankshaft
5 Driven part fixed with respect to the camshaft
6 Adjustment-unit shaft
7 Electrical adjustment unit
8 Adjusting shaft
9 Coupling
10 Internal toothing
11 Internal toothing
12 Spur wheel
13 Planet carrier
14 Rolling-bearing mounting
15 Sun wheel
16 Chain wheel
17 Recess
18 Sleeve
19 Elastomeric material
20 Radial region

The invention claimed is:

1. A device for the electrical adjustment of the relative rotary-angle position between a camshaft and a crankshaft of an internal combustion engine, comprising: an adjusting gear which has a driving part fixed with respect to the crankshaft, a driven part fixed with respect to the camshaft and an adjusting shaft connected fixedly in terms of rotation to an adjustment-unit shaft of an electrical adjustment unit, wherein the adjusting shaft is arranged in a radially floating manner, the adjusting gear is designed as a double epicyclic gear, and the double epicyclic gear has two adjacently arranged internal toothings, with which at least one spur wheel meshes simultaneously, the number of teeth of the two internal toothings being different, and the difference in number of teeth corresponding to the number of spur wheels or to a multiple of this.

2. The device according to claim 1, wherein, between the adjusting shaft and the adjustment-unit shaft, a coupling is arranged, which allows a slight relative radial displacement between the adjusting shaft and the adjustment-unit shaft.

3. The device according to claim 2, wherein the adjustment unit is designed as an electric motor or an electrical braking device.

4. The device according to claim 2, wherein the coupling is designed as an elastomeric coupling.

5. The device according to claim 2, wherein the coupling is designed as an Oldham coupling.

6. The device according to claim 1, wherein the at least one spur wheel is mounted in a planet carrier.

7. The device according to claim 6, wherein the planet carrier functions as an adjusting shaft.

8. The device according to claim 6, wherein the at least one spur wheel is mounted in the planet carrier by means of a rolling-bearing mounting.

9. The device according to claim 1, wherein the at least one spur wheel meshes with a centrally arranged sun wheel which is connected to the adjusting shaft or which functions as the adjusting shaft.

10. The device according to claim 1, wherein the amount of reduction of the adjusting gear is between 1:2 and 1:250.

11. The device according to claim 3, wherein the electrical adjustment unit is designed as a motor which has high-induction permanent magnet rotors.

* * * * *